United States Patent
Forthmann et al.

(10) Patent No.: US 9,478,050 B2
(45) Date of Patent: Oct. 25, 2016

(54) IMAGING SYSTEM FOR IMAGING AN OBJECT

(75) Inventors: Peter Forthmann, Sandesneben (DE); Thomas Koehler, Norderstedt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 163 days.

(21) Appl. No.: 13/978,166

(22) PCT Filed: Jan. 4, 2012

(86) PCT No.: PCT/IB2012/050037
§ 371 (c)(1),
(2), (4) Date: Jul. 3, 2013

(87) PCT Pub. No.: WO2012/093361
PCT Pub. Date: Jul. 12, 2012

(65) Prior Publication Data
US 2013/0279778 A1    Oct. 24, 2013

(30) Foreign Application Priority Data
Jan. 6, 2011  (EP) .................................... 11150297

(51) Int. Cl.
*G06K 9/00*  (2006.01)
*G06T 11/00*  (2006.01)

(52) U.S. Cl.
CPC ........ *G06T 11/006* (2013.01); *G06T 2211/416* (2013.01); *G06T 2211/424* (2013.01)

(58) Field of Classification Search
None
See application file for complete search history.

(56) References Cited

U.S. PATENT DOCUMENTS

| 4,472,827 | A |   | 9/1984  | Gabbay et al. |
|-----------|---|---|---------|---------------|
| 4,672,648 | A |   | 6/1987  | Mattson et al. |
| 5,033,074 | A |   | 7/1991  | Cotter et al. |
| 5,757,951 | A | * | 5/1998  | Tuy ................... G06T 11/005 378/4 |
| 6,320,936 | B1 |  | 11/2001 | Holland, Sr. et al. |
| 6,628,744 | B1 | * | 9/2003 | Luhta .................. A61B 6/032 378/15 |

(Continued)

FOREIGN PATENT DOCUMENTS

EP    1531426 A1 *  5/2005  .......... G06T 11/006

OTHER PUBLICATIONS

KJ Little, Effect of modeling anode size and angulation in fully iternative CT reconstruction, the first international conf on image formation in Xray computed tomography, Jun. 2010.*

(Continued)

*Primary Examiner* — Chan Park
*Assistant Examiner* — Iman Kholdebarin

(57) ABSTRACT

The invention relates to an imaging system for imaging an object. Projection data of the object are acquired by using a radiation source emitting primary radiation (14) from a primary focal spot (15) and unwanted secondary radiation (16) from secondary focal spots (17). A first image of the object is reconstructed from the acquired projection data, a forward projection of the secondary radiation through the first image is simulated for generating secondary projection data, and a second image is generated based on the acquired projection data and the secondary projection data. Since the secondary projection data, which can generally cause image artifacts, are determined, the reconstruction unit can consider these unwanted secondary projection data while reconstructing the second image, in order to reduce the influence of the secondary projection data on the reconstructed second image, thereby improving the image quality.

9 Claims, 3 Drawing Sheets

(56) References Cited

U.S. PATENT DOCUMENTS

| | | | |
|---|---|---|---|
| 6,778,636 B1 | 8/2004 | Andrews | |
| 6,990,368 B2* | 1/2006 | Simon | A61B 6/481 |
| | | | 378/21 |
| 7,187,756 B2* | 3/2007 | Gohno | G01N 23/046 |
| | | | 378/124 |
| 2003/0031299 A1* | 2/2003 | Ohishi | A61B 6/481 |
| | | | 378/162 |
| 2003/0123718 A1* | 7/2003 | Edic | G06T 11/005 |
| | | | 382/131 |
| 2004/0136490 A1* | 7/2004 | Edic | A61B 6/032 |
| | | | 378/4 |
| 2005/0025278 A1* | 2/2005 | Hagiwara | A61B 6/032 |
| | | | 378/7 |
| 2007/0230653 A1* | 10/2007 | Okamoto | A61B 5/02007 |
| | | | 378/8 |
| 2008/0240335 A1* | 10/2008 | Manjeshwar | A61B 6/032 |
| | | | 378/4 |
| 2008/0253515 A1* | 10/2008 | Bertram | G01N 23/04 |
| | | | 378/62 |
| 2009/0175406 A1* | 7/2009 | Zhang | A61B 5/113 |
| | | | 378/8 |
| 2009/0185655 A1* | 7/2009 | Koken | A61B 6/032 |
| | | | 378/11 |
| 2009/0190814 A1* | 7/2009 | Bouman | G06T 11/006 |
| | | | 382/131 |
| 2009/0225932 A1* | 9/2009 | Zhu | A61B 6/032 |
| | | | 378/7 |
| 2009/0310825 A1* | 12/2009 | Bontus | A61B 6/032 |
| | | | 382/107 |
| 2010/0080436 A1* | 4/2010 | Ohara | A61B 6/06 |
| | | | 382/132 |
| 2010/0172564 A1* | 7/2010 | Hagiwara | G06T 11/006 |
| | | | 382/131 |
| 2010/0329532 A1* | 12/2010 | Masuda | G01N 23/046 |
| | | | 382/132 |
| 2011/0110573 A1* | 5/2011 | Wiegert | A61B 6/032 |
| | | | 382/131 |
| 2011/0194787 A1* | 8/2011 | Chun | G06T 7/0051 |
| | | | 382/284 |
| 2012/0141006 A1* | 6/2012 | Koehler | G06T 11/006 |
| | | | 382/131 |
| 2012/0177267 A1* | 7/2012 | Chen | A61B 6/5258 |
| | | | 382/131 |
| 2013/0177132 A1* | 7/2013 | Takahashi | G06T 11/006 |
| | | | 378/4 |
| 2013/0182820 A1* | 7/2013 | Proksa | A61B 6/032 |
| | | | 378/8 |
| 2013/0243297 A1* | 9/2013 | Koehler | G06T 11/008 |
| | | | 382/131 |
| 2014/0086469 A1* | 3/2014 | Lefebvre | G01R 33/5611 |
| | | | 382/131 |
| 2014/0140601 A1* | 5/2014 | Litvin | G06T 11/005 |
| | | | 382/131 |
| 2014/0177794 A1* | 6/2014 | De Man | H01J 35/26 |
| | | | 378/62 |
| 2015/0139526 A1* | 5/2015 | Jeong | A61B 6/032 |
| | | | 382/132 |
| 2015/0185339 A1* | 7/2015 | Lage | G01T 1/2985 |
| | | | 600/425 |
| 2015/0325012 A1* | 11/2015 | Kojima | G06T 11/006 |
| | | | 382/131 |

OTHER PUBLICATIONS

Browne, J. A., et al.; Maximum-likelihood x-ray computed-tomography finite-beamwidth considerations; 1995; Applied Optics; 34(23)5199-5209.

Little, K. J., et al.; Effect of Modeling Anode Size and Angulation in Fully Iterative CT Reconstruction; 2010; Proceedings of First Intl. Conf. on Image Formation in X-ray Computed Tomography; pp. 256-259.

Zeng, K., et al.; Spatial Resolution Enhancement in CT Iterative Reconstruction; 2009; IEEE Nuclear Science Symposium and Medical Imaging Conference; pp. 3748-3751.

\* cited by examiner

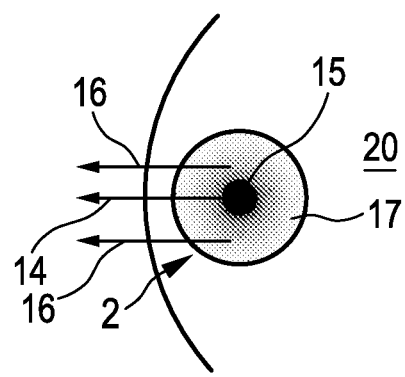
FIG. 2
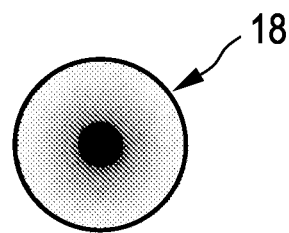      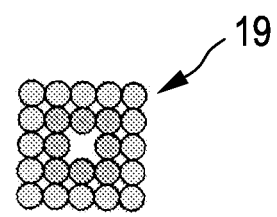
FIG. 3              FIG. 4

IMAGING SYSTEM FOR IMAGING AN OBJECT

FIELD OF THE INVENTION

The invention relates to an imaging system, an imaging method and an imaging computer program for imaging an object.

BACKGROUND OF THE INVENTION

An imaging system is, for example, a computed tomography system. A computed tomography system comprises a radiation source emitting radiation and a detection unit for generating projection data which depend on the intensity of the radiation after having traversed an object to be imaged, wherein the radiation source and the detection unit are rotated around the object, in order to acquire the projection data in different projection directions. The computed tomography system further comprises a reconstruction unit for reconstructing an image of the object from the acquired projection data.

The radiation source comprises a target material with a primary focal spot region, towards which electrons are accelerated by an acceleration field. The accelerated electrons meet the target material at the primary focal spot region and generate thereby primary radiation, which emanates from the primary focal spot region, and secondary electrons as a by-product. Some of these secondary electrons escape from the target material and are flung back towards the target material by the acceleration field. The secondary electrons meet the target material and generate thereby secondary radiation emanating from secondary focal spots regions. This secondary radiation adversely affects the acquired projection data and reduces therefore the quality of the acquired projection data, thereby also reducing the quality of the image of the object, which is reconstructed from the acquired projection data.

SUMMARY OF THE INVENTION

It is an object of the present invention to provide an imaging system, an imaging method and an imaging computer program for imaging an object, wherein the quality of a reconstructed image of the object can be improved.

In a first aspect of the present invention an imaging system for imaging an object is presented, wherein the imaging system comprises:
 a projection data providing unit for providing acquired projection data of the object, wherein the projection data have been acquired by moving a radiation source emitting primary radiation from a primary focal spot and secondary radiation from secondary focal spots and the object relative to each other and by detecting the projection data, which are indicative of the primary and secondary radiation after having traversed the object, while the radiation source and the object are moved relative to each other,
 a reconstruction unit for reconstructing a first image of the object from the acquired projection data,
 a forward projection unit for simulating a forward projection of the secondary radiation through the first image for generating secondary projection data, wherein the reconstruction unit is adapted to generate a second image based on the acquired projection data and the secondary projection data.

By simulating a forward projection of the secondary radiation through the first image, secondary projection data can be generated, which are caused by the unwanted secondary radiation emanating from the secondary focal spots. Since these secondary projection data, which cause image artifacts, are now known, the reconstruction unit can consider these unwanted secondary projection data while reconstructing the second image, in order to reduce, in particular, eliminate, the influence of the secondary projection data on the reconstructed second image, thereby improving the image quality.

The projection data providing unit can be a storing unit, in which the acquired projection data are stored already, or the projection data providing unit can be a projection data acquisition unit of, for example, a computed tomography system or an x-ray C-arm system. The radiation source is preferentially adapted to emit x-rays. The radiation source can also be adapted to emit other kinds of electromagnetic radiation.

The reconstructing unit can be adapted to perform, for example, a filtered back projection or another reconstruction algorithm like an iterative reconstruction algorithm, a Radon inversion algorithm, et cetera for reconstructing the first image and the second image.

It is preferred that the forward projection unit comprises a representation of the secondary focal spots and is adapted to simulate the forward projection based on simulated secondary radiation emanating from the representation of the secondary focal spots and the first image. It is further preferred that the representation of the secondary focal spots forms a halo around the primary focal spot. The halo can be regarded as a ring or a circular area with an opening, which represents the primary focal spot, in the center of the circular area. It is also preferred that the representation is a group of discrete points located around the primary focal spot. In an embodiment, the forward projection unit is adapted to simulate the forward projection such that a secondary focal spot having a larger distance to the primary focal spot emanates secondary radiation having a smaller intensity than a secondary focal spot having a smaller distance to the primary focal spot. In particular, with increasing distance of the respective secondary focal spot to the primary focal spot, the intensity of the respective secondary focal spot can be decreased. In another embodiment, the forward projection unit is adapted to simulate the forward projection such that the intensity of the secondary radiation emanating from the secondary focal spots firstly increases to a maximum and then decreases with increasing distance of the respective secondary focal spot to the primary focal spot. This allows simulating the forward projection of the secondary radiation through the first image very accurately.

In a preferred embodiment, the reconstruction unit is adapted to determine difference projection data by subtracting the secondary projection data from the acquired projection data and to reconstruct the second image from the difference projection data. It is further preferred that the reconstruction unit is adapted to reconstruct a secondary radiation image from the secondary projection data and to subtract the secondary radiation image from the first image for generating the second image. This allows generating the second image in a relatively simple way based on the secondary projection data and the acquired projection data such that the quality of the second image is improved.

In a further aspect of the present invention an imaging method for imaging an object is presented, wherein the imaging method comprises:

providing acquired projection data of the object, wherein the projection data have been acquired by moving a radiation source emitting primary radiation from a primary focal spot and secondary radiation from secondary focal spots and the object relative to each other and by detecting the projection data, which are indicative of the primary and secondary radiation after having traversed the object, while the radiation source and the object are moved relative to each other, reconstructing a first image of the object from the acquired projection data, simulating a forward projection of the secondary radiation through the first image for generating secondary projection data, generating a second image based on the acquired projection data and the secondary projection data.

In a further aspect of the present invention an imaging computer program for imaging an object is presented, wherein the imaging computer program comprises program code means for causing an imaging system as defined in claim 1 to carry out the steps of the imaging method as defined in claim 9, when the computer program is run on a computer controlling the imaging system.

It shall be understood that the imaging system of claim 1, the imaging method of claim 9 and the imaging computer program of claim 10 have similar and/or identical preferred embodiments as defined in the dependent claims.

It shall be understood that a preferred embodiment of the invention can also be any combination of the dependent claims with the respective independent claim.

BRIEF DESCRIPTION OF THE DRAWINGS

In the following drawings:

FIG. 2 shows schematically and exemplarily a primary focal spot and a halo on a target material of a radiation source of the imaging system, FIG. 3 shows schematically and exemplarily a halo from which secondary radiation can emanate, FIG. 4 shows schematically and exemplarily a representation of secondary focal spots.

DETAILED DESCRIPTION OF EMBODIMENTS

Figure 1:
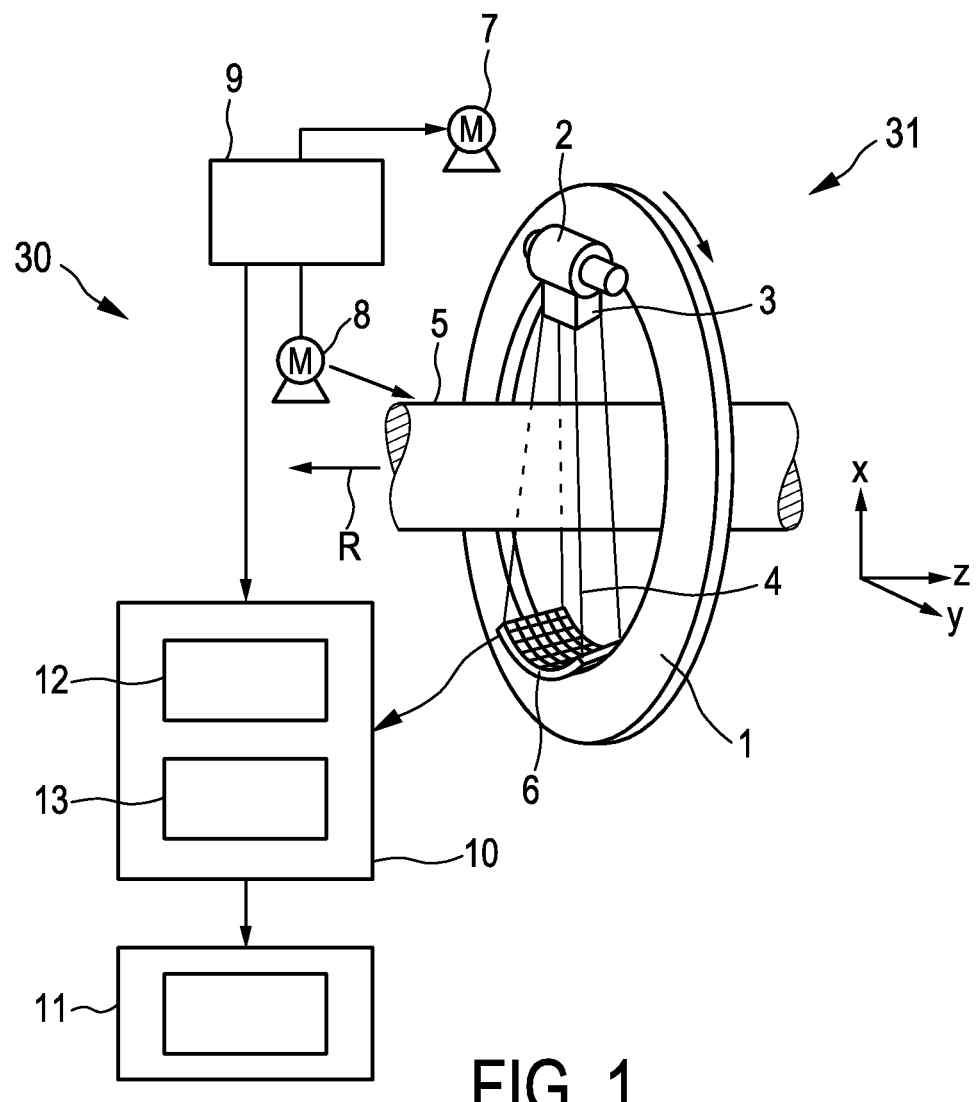
FIG. 1 shows schematically and exemplarily an embodiment of an imaging system for imaging an object.

FIG. 1 shows schematically exemplarily an embodiment of an imaging system for imaging an object. In this embodiment, the imaging system is a computed tomography system 30, which includes a gantry 1 which is capable of rotation about a rotational axis R which extends parallel to the z direction. A radiation source 2, which is, in this embodiment, an x-ray tube, is mounted on the gantry 1. The radiation source emits primary radiation from a primary focal spot and secondary radiation from secondary focal spots and is provided with a collimator 3, which forms, in this embodiment, a conical radiation beam from the primary radiation and the secondary radiation generated by the radiation source 2. The conical radiation traverses the object which is, for example, a person, an animal or a technical object. The object is located within an examination zone 5, which is, in this embodiment, cylindrical. After having traversed the examination zone 5 the radiation beam 4 is incident on a detection device 6, which comprises a two-dimensional detection surface. The detection surface 6 is mounted on the gantry 1.

The computed tomography system 30 comprises two motors 7, 8. The gantry 1 is driven at a preferably constant but adjustable angular speed by the motor 7. The motor 8 is provided for displacing the region of interest by displacing the object, for example, a person, who is arranged on a patient table in the examination zone 5, parallel to the direction of the rotational axis R or the z axis. These motors 7, 8 are controlled by a control unit 9, for instance, such that the radiation source 2 and the examination zone 5 and, thus, the object within the examination zone 5, move relatively to each other along a helical trajectory. However, it is also possible that the relative movement is performed along another trajectory. For instance, it is also possible that the object is not moved, but that only the radiation source 2 is rotated, i.e. that the radiation source 2 moves along a circular trajectory relative to the object. Furthermore, in another embodiment, the collimator 3 can be adapted for forming another beam shape, in particular, a fan beam, and the detection device 6 can comprise a detection surface, which is shaped corresponding to the other beam shape, in particular, to the fan beam.

During a relative movement of the radiation source 2 and the object the detection device 6 generates acquired projection data of the object depending on the radiation incident on the detection surface of the detection device 6. Therefore, the radiation source 2, the elements for moving the radiation source 2 relative to the object, in particular, the motors 7, 8 and the gantry 1, and the detection device 6 form a projection data providing unit 31 for providing acquired projection data of the object.

The acquired projection data are provided to an image generation device 10 for generating an image of the object from the projection data. The image generation device 10 comprises a reconstruction unit 12 for reconstructing a first image of the object from the acquired projection data, and a forward projection unit 13 for simulating a forward projection of the secondary radiation through the first image for generating secondary projection data, wherein the reconstruction unit 12 is adapted to generate a second image based on the acquired projection data and the secondary projection data. The second image is provided to a display unit 11 for displaying the second image.

FIG. 2 shows schematically and exemplarily a part of a target material 20 of the radiation source 2. As can be seen in FIG. 2, the target material 20 comprises the primary focal spot 15 to which electrons are accelerated by an acceleration field. The accelerated electrons meet the target material 20 at the primary focal spot 15 and generate thereby the primary radiation 14 and secondary electrons as by-product. Some of these secondary electrons escape from the target material 20 and are flung back towards the target material 20 by the acceleration field. The secondary electrons meets the target material 20 and generate thereby the secondary radiation 16 emanating from the secondary focal spots located within a region 17, which may be regarded as halo region and which surrounds the primary focal spot 15.

In this embodiment, the reconstruction unit 12 is adapted to perform a filtered back projection for reconstructing the first image and the second image. However, in another embodiment the reconstruction unit can also be adapted to perform another reconstruction algorithm like an iterative reconstruction algorithm, a Radon inversion algorithm, et cetera for reconstructing the first image and the second image. For performing the forward projection, the forward projection unit 13 comprises a representation of the secondary focal spots, wherein the forward projection unit 13 is adapted to simulate the forward projection based on simulated secondary radiation emanating from the representation of the secondary focal spots and the first image. Thus, simulated secondary radiation which is similar to the real secondary radiation present while acquiring the real projection data, in particular, which corresponds to the acquisition geometry present while acquiring the real projection data, is forward projected through the first image in a simulation for generating the secondary projection data.

The representation of the secondary focal spots can form a halo around the primary focal spot as schematically and exemplarily shown in FIG. 3. In FIG. 3, the halo 18 is a ring-shaped or circular area with an opening, which represents a primary focal spot, in the center of the ring-shaped or circular area. The forward projection unit can be adapted such that it simulates secondary radiation emanating from secondary focal spots within the halo 18. In another embodiment, the representation of the secondary focal spots can also be a group 19 of discrete points located around the primary focal spot as schematically and exemplarily shown in FIG. 4.

The representation of the secondary focal spots can be determined by measurements and/or simulations, wherein a region around the primary focal spot is determined, from which the secondary radiation emanates and wherein this region can be, for example, discretized, in order to determine the representation of the secondary focal spots. The representation of the secondary focal spots can also be just an assumed model comprising the secondary focal spots distributed around the primary focal spot. This model can be adjusted by calibration reconstructions, wherein the model is modified such that image artifacts are reduced.

The forward projection unit 13 is adapted to simulate the forward projection such that a secondary focal spot having a larger distance to the primary focal spot emanates secondary radiation having a smaller intensity than a secondary focal spot having a smaller distance to the primary focal spot. In particular, with increasing distance of the respective secondary focal spot to the primary focal spot, the intensity of the respective secondary focal spot can be decreased. Also this intensity distribution can be defined by the representation of the secondary focal spots and can be determined by measurements and/or simulations. Moreover, also the above described adaptation of an initial model of the representation of the secondary focal spot such that image artifacts are reduced can be used for determining the intensity variation. In other embodiments, the intensity dependence can also be another one. For example, the intensity of the secondary radiation emanating from the secondary focal spots can firstly increase to a maximum and then decrease with increasing distance of the respective secondary focal spot to the primary focal spot.

The reconstruction unit 12 is adapted to determine difference projection data by subtracting the secondary projection data from the acquired projection data and to reconstruct the second image from the difference projection data. In another embodiment, the reconstruction unit can be adapted to reconstruct a secondary radiation image from the secondary projection data and to subtract the secondary radiation image from the first image for generating the second image.

Figure 5:
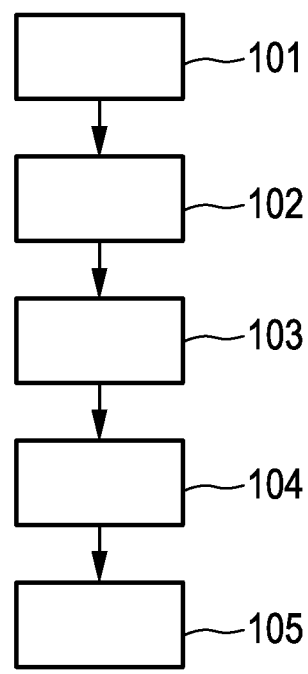
FIG. 5 shows a flowchart exemplarily illustrating an embodiment of an imaging method for imaging an object.

In the following an embodiment of an imaging method for imaging an object will exemplarily be described with reference to a flowchart shown in FIG. 5.

In step 101, acquired projection data are provided. For example, the radiation source 2 emitting primary radiation 14 from a primary focal spot 15 and secondary radiation 16 from secondary focal spots can be moved relative to the object and the projection data, which are indicative of the primary radiation and the secondary radiation after having traversed the object, can be detected while the radiation source 2 and the object are moved relative to each other. In step 102, a first image of the object is reconstructed from the acquired projection data by using, for example, a back projection algorithm. In step 103, a forward projection of the secondary radiation is simulated through the first image for generating secondary projection data, and, in step 104, a second image is reconstructed based on the acquired projection data and the secondary projection data. In particular, in step 104, difference projection data can be determined by subtracting the secondary projection data from the acquired projection data and the second image can be reconstructed from the difference projection data. In step 105, the reconstructed second image of the object is shown on the display unit 11.

In the prior art, the effect of the multitude of secondary focal spots being present in the acquisition can lead to a blurring at, for example, bone edges. In order to remove this influence of the excess off-focal radiation, in particular, in both axial, i.e. parallel to the rotational axis R or the z axis, and the rotational direction, i.e. the direction being perpendicular to the axial direction on the target material of the radiation source, the imaging system and imaging method perform preferentially the above described two-pass method that resimulates the acquisition using the first reconstructed image. The second pass is preferentially done only with the estimated focal spot halo, i.e. the representation of the secondary focal spots. The data thus generated are subtracted from the original projection data, in order to reduce, in particular, eliminate, the off-focal effect.

Although in the above described embodiment the projection data providing unit is a projection data acquisition unit of a computed tomography system, the projection data providing unit can also be a projection data acquisition unit of another imaging system like an x-ray C-arm system, or the projection data providing unit can be a storing unit, in which the acquired projection data are stored already.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Calculations like a reconstruction or a forward projection performed by one or several units or devices can be performed by any other number of units or devices. For example, steps 102 to 104 can be performed by a single unit or by any other number of different units. The calculations and/or the control of the imaging system in accordance with the imaging method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to an imaging system for imaging an object. Projection data of the object are acquired by using a radiation source emitting primary radiation from a primary focal spot and unwanted secondary radiation from secondary focal spots. A first image of the object is reconstructed from the acquired projection data, a forward projection of the secondary radiation through the first image is simulated for generating secondary projection data, and a second image is generated based on the acquired projection data and the secondary projection data. Since the secondary projection data, which can generally cause image artifacts, are determined, the reconstruction unit can consider these unwanted secondary projection data while reconstructing the second image, in order to reduce the influence of the secondary projection data on the reconstructed second image, thereby improving the image quality.

The invention claimed is:

1. An imaging system for imaging an object, the imaging system comprising:
   a projection data providing unit which includes a configured computer for providing acquired projection data of the object, wherein the projection data have been acquired by moving a radiation source emitting both primary radiation from a primary focal spot and secondary radiation from secondary focal spots and by detecting the projection data, which are indicative of the primary radiation and the secondary radiation after having traversed the object, while the radiation source and the object are moved relative to each other, wherein the secondary radiation is formed at the secondary focal spots by secondary electrons emanated as a by-product of the primary radiation from the primary focal spot;
   a reconstruction unit which includes a configured computer for reconstructing a first image of the object from the acquired projection data;
   a forward projection unit which includes a configured computer for simulating a forward projection of the secondary radiation from the secondary focal spots through the first image which generates simulated secondary projection data; and
   wherein the reconstruction unit is futher adapted to determine difference projection data by subtracting the simulated secondary projection data from the acquired projection data and to reconstruct a second image from the difference projection data.

2. The imaging system as defined in claim 1, wherein the forward projection unit comprises a representation of the secondary focal spots and is adapted to simulate the forward projection based on the simulated secondary radiation emanating from the representation of the secondary focal spots and the first image.

3. The imaging system as defined in claim 2, wherein the representation of the secondary focal spots forms a halo around the primary focal spot.

4. The imaging system as defined in claim 2, wherein the representation is a group of discrete points located around the primary focal spot.

5. The imaging system as defined in claim 2, wherein the forward projection unit is adapted to simulate the forward projection such that a secondary focal spot of the secondary focal spots having a larger distance to the primary focal spot emanates the secondary radiation having a smaller intensity than a different secondary focal spot of the secondary focal spots having a smaller distance to the primary focal spot.

6. The imaging system as defined in claim 2, wherein the forward projection unit is adapted to simulate the forward projection such that the intensity of the secondary radiation emanating from the secondary focal spots firstly increases to a maximum and then decreases with increasing distance of the respective secondary focal spot to the primary focal spot.

7. An imaging method for imaging an object, the imaging method comprising:
   providing acquired projection data of the object, wherein the projection data have been acquired by moving a radiation source emitting both primary radiation from a primary focal spot and secondary radiation from secondary focal spots and by detecting the projection data, which are indicative of both the primary radiation and the secondary radiation after having traversed the object, while the radiation source and the object are moved relative to each other, wherein the secondary radiation is formed at the secondary focal spots by secondary electrons emanated as a by-product of the primary radiation from the primary focal spot;
   reconstructing a first image of the object from the acquired projection data;
   simulating a forward projection of the secondary radiation emitted by the secondary focal spots through the first image which generates simulated secondary projection data; and
   generating a second image from the acquired projection data and the simulated secondary projection data which includes determining difference projection data by subtracting the simulated secondary projection data from the acquired projection data and reconstructing the second image from the difference projection data.

8. An imaging computer program for imaging an object, the imaging computer program comprising non-transitory computer-readable storage media including program code for causing an imaging system to carry out the steps of the imaging method as defined in claim 7, when the computer program is run on a computer controlling the imaging system.

9. An imaging system for imaging an object, the imaging system comprising:
   a projection data providing unit which includes a configured computer for providing acquired projection data of the object, wherein the projection data have been acquired by moving a radiation source emitting both primary radiation from a primary focal spot and secondary radiation from secondary focal spots and by detecting the projection data, which are indicative of the primary and secondary radiation after having traversed the object, while the radiation source and the object are moved relative to each other, wherein the secondary radiation is formed at the secondary focal spots by secondary electrons emanated as a by-product of the primary radiation from the primary focal spot;
   a reconstruction unit which includes a configured computer for reconstructing a first image of the object from the acquired projection data;
   a forward projection unit which includes a configured computer for simulating a forward projection of the secondary radiation emitted from the secondary focal spots through the first image which generates simulated secondary projection data; and
   wherein the reconstruction unit is adapted to reconstruct a secondary radiation image from the simulated secondary projection data and to subtract the secondary radiation image from the first image which generates a second image.

* * * * *